United States Patent [19]

Teel et al.

[11] Patent Number: 4,954,999
[45] Date of Patent: Sep. 4, 1990

[54] DOUBLE PHASE-LOCK-LOOP SONAR

[75] Inventors: Willis A. Teel; James T. Christoff, both of Panama City, Fla.

[73] Assignee: The United States of America as represented by the Secretary of the Navy, Washington, D.C.

[21] Appl. No.: 609,453

[22] Filed: Aug. 28, 1975

[51] Int. Cl.$^5$ .............................................. G01S 15/00
[52] U.S. Cl. ...................................................... 367/97
[58] Field of Search ........................... 340/3 D; 367/97

[56] References Cited

U.S. PATENT DOCUMENTS 2,961,190  11/1960  Miller et al. ........................... 367/97
3,024,755   3/1962  Brooks ................................... 367/96
3,617,995  11/1971  Goulet .................................... 367/97

Primary Examiner—Thomas H. Tarcza
Assistant Examiner—Daniel T. Pihulic
Attorney, Agent, or Firm—Harvey David; John Becker; Sol Sheinbein

[57] ABSTRACT

A doppler compensated sonar systems is disclosed as containing one or more data processing channels connected through a multiplexer to a like plurality of piezoelectric elements in a reversible electro-acoustical transducer. Each channel thereof includes a transmitter and a receiver, the latter of which includes signal perfecting circuitry and a pair of effectively series connected phase lock loops constituting reverberation and target doppler tracking filters, respectively. Hence, each of said channels effectively process received target signals without any adverse doppler effects being present therein which are then, in turn, read out by any suitable video display. When mounted on a fast moving vehicle, the subject doppler compensated sonar system optimizes the avoidance of hazardous or other objects that may occur in the path thereof.

18 Claims, No Drawings

_4,954,999_

DOUBLE PHASE-LOCK-LOOP SONAR

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates, in general, to echo-search-ranging systems for detecting targets in the path of a moving vehicle located in any particular predetermined environmental medium, and for identifiying them and indicating the range thereto. In particular, the subject invention is a sonar system for detecting targets located within an aqueous medium, for identifying them, and indicating thereto, while simultaneously computing the speed of the carrier vehicle thereof and the speed of the target, if any. In even greater particularity, the invention is an improved doppler-compensated sonar system that facilitates the avoidance of logs, marine mines, and other hazards floating on the surface of or submerged within water by a fast moving vehicle running on, above, or below the surface thereof, and for detecting and identifying various and sundry marine objects, including submarine boats and the like. A most useful, example of the subject invention is using it in conjunction with a high-speed hydrofoil boat for avoiding otherwise unavoidable hazards in the path thereof and for locating, detecting, and identifying said submarine boats or other marine vehicles. Of course, the aforementioned operations may be facilitated or otherwise improved by using the subject sonar system as an adjunct to the other navigation instrumentation employed in connection with the aforesaid high-speed hydrofoil boat or other carrier vehicle.

DESCRIPTION OF THE PRIOR ART

Heretofore, conventional narrow band sonar systems have been employed to detect surface and subsurface hazards that may be encountered by water craft during the running thereof along their predetermined course. For instance, multi-channel sonar receivers operating in parallel using adjacent narrow band filters which are rapidly sampled have been used for such purposes. Nevertheless, most thereof leave something to be desired because of their complexity, insufficient reliability, and cost of manufacture. Furthermore, their accuracy is generally too inadequate to be useful in conjunction with high-speed boats, etc.; and when they are so used, highly trained personnel are usually required to calibrate and operate them, if false targets indications and observations are to be obviated.

Perhaps the closest known prior art is disclosed by patent application ser. no. 413403, entitled Sonar System, by Willis A. Teel, filed in the United States Patent Office on Nov. 2, 1973, and which will ostensively be issued subsequently. Said prior art Sonar System combines a transmitter and a single channel receiver which incorporates a mixer and a narrow pass band filter connected in series therein. A single phase lock loop of the negative feed back type is connected between the control input and the output of the aforesaid mixer which effectively determines the occurrence of any doppler effects being processed in said receiver channel and compensates therefor by appropriate adjustment of the frequency of the signal supplied to the control input of said mixer, thereby causing the remainder of said receiver channel, including said narrow band pass filter, to process received target signals without any doppler effects being present therein due to the relative motion of the carrier vehicle thereof and any particular target acquired thereby.

SUMMARY OF THE INVENTION

The instant invention overcomes many of the disadvantages of the aforementioned prior art, in that it is exceedingly rapid-acting, relatively accurate, continuous in operation, may be operated by people of little or no training, and in spite of its sophistication, is comparatively economical to manufacture, operate, maintain, and store. In addition, with only minor design modifications—such as those as would be well within the purview of one skilled in the art having the benefit of the teaching presented herewith—the subject invention is adaptable for use with many existing mobile platforms or vehicles, regardless of the ambient environment within which they are intended to operate. Of course, its non-navigation capabilities are so copious in quantity that they ostensively would be recognized by the artisans of other arts to which it could pertain, thereby increasing the possible applications thereof considerably. Two of such arts might, for example, be: the analysis of materials, either moving or stationary with respect thereto; and perhaps for medical diagnosis between a given sensor and other relative parts of the human body.

Briefly, the subject invention is a method and means for reducing the noise bandwidth of a sonar system by deletion of undesirable ambient reverberations and target speed, if any. Hence, the signal-to-noise ratio thereof is somewhat improved, especially when operating from a high speed mobile platform. Such improvements are accomplished by automatically tracking the doppler-shifted reverberation and compensating the received signal with a phase lock loop signal proportional thereto. The resulting effective narrow band operation has been found to improve the signal-to-noise ratio of the subject sonar system to a considerable extent. In addition to the above, the movement of a particular target is also doppler compensated by processing the received target signal through a second phase locked loop, thereby effectively deleting most of the target signals that would otherwise occur as a result of the movement thereof within the environmental medium within which it is disposed, as far as doppler is concerned.

Concomitant with each of the aforesaid signal-to-noise improvements, the sonar constituting the subject invention provides several secondary benefits, namely, a precise method and means for determining the velocity of a fast moving carrier vehicle and a precise method and means for determining the velocity of the speed of a target relative to its environmental medium. These features, of course, are exceedingly valuable if and when the aforesaid fast-moving vehicle happens to be a hydrofoil boat that is traveling in uncharted waters.

It is, therefore, an object of this invention to provide an improved echo-search-ranging system.

Another object of this invention is to provide an improved doppler sonar system.

A further object of this invention is to provide an improved method and means for detecting, identifying, and determining the range of such objects floating on the surface of or submerged within water, sea water, or the like in which a rapidly moving marine vehicle is traveling.

A further object of this invention is to provide a doppler-compensated sonar system with improved signal-to-noise ratio characteristics which, in turn, facilitates the avoidance of logs, debris, and other hazardous objects located in the water in which a vehicle is traveling.

Still another object of this invention is to provide an improved method and means for automatically tracking a doppler-shifted reverberation spectrum.

A further object of this invention is to provide an improved method and means for precisely measuring the velocity of mobile platforms, such as hydrofoil boats, aircushioned craft, spacecraft, submarine vehicles, submarine boats, land craft, aircraft, fixed craft, and the like.

Another object of this invention is to provide an improved method and means for precisely measuring the velocity of a target relative to the environmental medium within which it is moving.

Still another object of this invention is to provide a sonar system that facilitates the navigation of vehicles and crafts along uncharted paths within their respective environmental mediums, and esepcially of marine vehicles through uncharted waters.

Another object of this invention is to provide an improved method and means for doppler compensating an echo-search-ranging system, such as, for example, a sonar system employed in operational situations involving relatively moving objects, regardless of whether or not it happens to be designed as an active or a passive sonar system.

Another object of this invention is to provide a new and unique and multiple phase lock loop circuit combination for the purpose of deleting a pair of different and unwanted signals from a received target signal.

Another object of this invention is to provide an improved method and means for series connecting a plurality of phase lock loops, so as to prevent their adverse interaction.

Other objects and many of the attendant advantages will be readily appreciated as a subject invention becomes better understood by reference to the following detailed description, when considered in conjunction with the accompanying drawings.

DESCRIPTION OF THE PREFERRED EMBODIMENT

Figure 1:
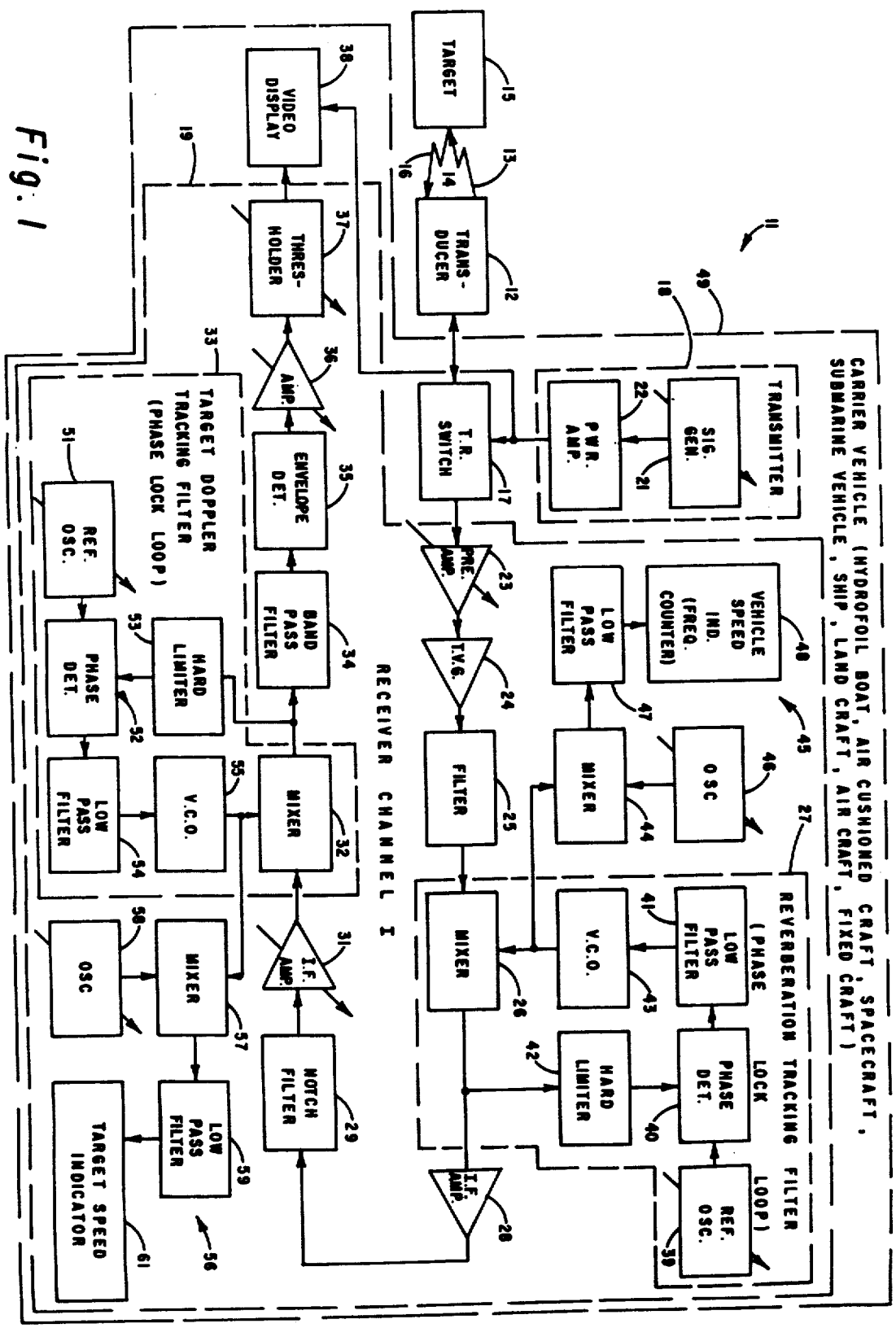
FIG. 1 is a block diagram of preferred embodiment of the sonar system constituting this invention.

Referring now to FIG. 1, the subject double doppler compensated sonar system 11 is depicted. For the purpose of emphasis, it should perhaps again be mentioned that the instant invention is primarily intended to be designed as and used as a sonar system. However, if so desired, it could also be designed as, say, a radar system, an infrared search system, or any other echo-search-ranging system, including many other types of sonar systems, be they active or passive.

Accordingly, the preferred embodiment of sonar system 11 of FIG. 1 is disclosed as having a reversible (that is, having an input-output) electroacoustical transducer 12 which is adapted for broadcasting acoustical energy throughout its ambient environmental medium—water in this case—in response to and proportional to an electrical signal supplied thereto, and for producing an electrical output signal proportional to a received acoustical signal from within said ambient environmental medium.

In the instant case, it may be seen in FIG. 1 that transducer 12 broadcasts acoustical energy 13 throughout water 14 where it acquires a target 15—such as boats, logs, submerged tree stumps, rocks, submarines, or other objects—from which it is reflected as an echo signal 16 back toward transducer 12.

The input-output of transducer 12 is connected to the input-output of a transmit-receive (TR) switch 17, which, of course, is a conventional device that prevents the signals generated by a transmitter portion 18 of the invention from being received by a receiver portion 19 during the time the target search signals are being broadcast by transducer 12. Of course, said conventional transmit-receive switch has a data signal input which is connected to the output of the aforementioned transmitter 18 and a data signal output that is connected to the input of the aforesaid receiver 19.

As may readily be seen, transmitter 18 comprises an adjustable frequency signal generator 21, which, in this particular instance, will be considered as having been set to generate a pulsed carrier wave (CW) signal having a train of sine waves at an operating frequency of the order of 100 KHz and train length of 5 milliseconds. The output of signal generator 21 is connected to the input of an adjustable power amplifier 22. The output of power amplifier 22, in fact, constitutes the output of transmitter 18 and is connected to the data signal input of the aforementioned transmit-receive switch 17.

The data signal output of transmit-receive switch 17 is connected to the input of a variable preamplifier 23 of receiver 19, with the output thereof connected to the input of a time-varied gain (TVG) amplifier 24.

The output of time-varied gain amplifier 24 is connected to the input of a filter 25, with the output thereof connected to the input of a mixer 26, which should be considered as being a part of two circuits, Vis., receiver circuit 19 and a doppler compensating phase lock loop circuit 27, the latter of which is, in actuality, a reverberation tracking filter and one of the key components of the instant invention which will be discussed in considerable detail subsequently.

The output of mixer 26 is connected to the input of an intermediate frequency (IF) amplifier 28 designed in this particular instance for operational amplification at a frequency of the order of 31.2 KHz, and the output of intermediate frequency amplifier 28 is connected to the input of a notch filter 29 that has been designed to be centered at and thus have its minimum response at a frequency of 31.2 KHz, with the maximum response thereof being in a chosen band on either side thereof. The bandwidth of this filter should be chosen so as to have a band equal to 1/PL, where PL is the length of the pulsed CW signal. In this particular case, such bandwidth is equal to the reciprocal of 5 milliseconds or 200 Hz.

The output of notch filter 29 is connected to another 31.2 KHz intermediate frequency (IF) amplifier 31, with the output thereof connected to the input of another mixer 32 which may likewise be considered as being a part of two circuits, namely, receiver circuit 19 and a second phase lock loop circuit portion thereof constituting a target doppler track filter 33, the latter of which is also a key component of the instant invention, like aforementioned phase lock loop 27.

As far as the structures of phase lock loop 27 and phase lock loop 33 are concerned, the component configurations thereof are substantially similar; however, each thereof is designed to be operative with respect to different frequencies, so as to effect the deletion of the frequencies constituting the ambient reverberation signals and the target doppler signals. With this in mind, it may readily be seen that the subject invention removes two sets of signals which would otherwise be deleterious to the signal-to-noise ratio of the invention, if they were not incorporated therein.

The output of mixer 32 is connected through a bandpass filter 34 to the input of an envelope detector 35, the output of which is connected through a variable gain amplifier 36 to the input of a thresholder 37 which may be adjusted to be responsive to any given level signal, as desired. The output of the aforementioned mixer 32 constitutes the output for target doppler tracking filter 33, and the output of thresholder 37 constitutes the output of the aforesaid receiver 19.

The output of thresholder 37 is connected to the data signal input of a suitable readout, such as, for example, an oscilliscope video display 38. For the purpose of synchronizing the beginning of the broadcast of target search signal 13 with video display 38, so that target range information will be indicated thereby, the output of the aforementioned power amplifier 22 of transmitter 18 is connected to the sweep trigger input of said video display 38, as is conventional in the sonar art.

For the purposes of this invention, thresholder 37 has been shown as being separate and self-contained; however, it should be understood that it may be an included component of video display 38 or any other readout, if so desired. Therefore, the self-contained separate embodiment thereof should be considered as being optional, with the proper selection thereof being a matter of designed choice of the artisan. Obviously, it would be well within the purview of one skilled in the art having the benefit of the teachings presented herewith to select whatever thresholder arrangement would be optimum for any given set of component in operational circumstances.

As indicated above, the reverberation tracking filter phase lock loop circuit 27 of the invention is an exceedingly important sub-system or component thereof. In this particular preferred embodiment, it comprises an adjustable crystal control reference oscillator 39 that is set to generate a 31.2 KHz signal at the output thereof, which is connected to the inputs of a phase detector 40, the output of which, in turn, is connected to the input of a low pass filter 41 that has been designed to block the 31.2 KHz signal and pass the lower side band or the difference signal between 31.2 KHz and another signal—that is, the error signal, as will be discussed later—supplied to the other input of phase detector 40 by a hard limiter 42.

The output of low pass filter 41 is connected to the control input of a voltage controlled oscillator (VCO) 43, the output of which is connected to the other input of the aforesaid mixer 26. For reasons which will be obvious later, VCO 43 has been calibrated and set to produce an output signal having 68.8 KHz for a zero voltage signal supplied thereto. Of course, the output of mixer 26 is also connected to the input of hard limiter 42, to thereby complete the negative feedback loop of the phase lock loop circuit constituting reverberation tracking filter 27. Hard limiter 42 is of the type that restricts the amplitude of the signal supplied thereto to a constant value before passing it along to phase detector 40. And voltage control oscillator 43 increases the frequency of the signal supplied thereto in proportion to the error voltage before, in turn, supplying it to mixer 26.

The output of voltage controlled oscillator 43 is also connected to one of the inputs of another mixer 44 of an indicator circuit 45. An adjustable oscillator 46, set in this instance to produce a 68.8 KHz signal, is connected to the other input of mixer 44. A low pass filter 47 is connected to the output of mixer 44, with the output thereof connected to the input of a frequency counter 48 that has been calibrated to read out as a speed indicator for whatever vehicle is being used as the carrier vehicle 49 on which the subject sonar system 11 is mounted. At this time, it would appear to be noteworthy that carrier vehicle 49 may be any of many different types. However, in the preferred embodiment disclosed herein, it happens to be a high-speed hydrofoil boat, such as that has been schematically depicted in FIG. 3. Nevertheless, it should be understood that it may be other mobile vehicles, too—such as, for instance, a ship, a submarine boat or other water vehicle, an aircushioned vehicle, an aircraft, a spacecraft, a landcraft or vehicle, or the like. Furthermore, it should be obvious that the environmental mediums within which the aforementioned possible carrier vehicles may operate may be water, sea water, or whatever particular environmental medium would be appropriate therefor, respectively, taking into consideration their normal respective operational characteristics. Obviously, the type of carrier vehicle involved and the particular environmental medium or mediums within which it is intended to travel would be taken into consideration by the artisan making and using the subject invention. And, of course, it would be well within the purview thereof to make such design choices as would be necessary to make in order to construct and use whatever embodiment of the invention as would be necessary or optimum for any given operational circumstances, once he had the benefit of the teachings presented herewith.

Referring again to FIG. 1, it may readily be seen that the aforementioned mixer 32 and envelope detector 35 are two of the elements of the aforesaid phase lock loop 33 which constitutes a target doppler track filter. The operation of this filter is identical to that of the aforesaid reverberation tracking filter phase lock loop 27, except the time constants are chosen to provide "lock-on" to shorter duration signals corresponding to the target movement, as opposed to the continous reverberation signal.

Again, it would appear to be noteworthy that target doppler track filter phase lock loop 33 incorporates an adjustable frequency reference oscillator 51, the output of which is connected to one of the inputs of a phase detector 52. The other input of phase detector 52 is connected to the output of a hard limiter 53, the input of which is connected to the output of the aforementioned mixer 32. The output of loop phase detector 52 is connected to the input of a low pass filter 54, the output of which is connected to the input of a voltage controlled oscillator 55 (VCO), the output of which is connected to the other input of the aforesaid mixer 32, thereby completing the negative feedback loop portion of phase lock loop 33.

The output of the aforementioned voltage control oscillator 55 is optionally connected to the input of a target speed indicator circuit, including a mixer 57, one input of which is connected to the output of said voltage control oscillator 55, and the other input of which is connected to the output of adjustable frequency oscillator 58. The output of mixer 57 is connected to the input of a low pass filter 59, the output of which is connected to any suitable frequency counter 61 which is calibrated as a target speed indicator.

At this time, it would appear to be noteworthy that all of the components illustrated in block form in the drawing are well known and conventional per se; consequently, it is their unique interconnections and interactions that cause them to result in the new and useful combination of elements constituting this invention.

Of course, it should readily be appreciated that those elements making up transmitter 18 and receiver 19 of FIG. 1 constitute one channel of a sonar system which may, in fact, include any number of other channels which are similar thereto but designed to be operative with respect to different reverberation and target speed velocities or frequencies. Accordingly, such multichannel arrangement has been portrayed schematically in FIG. 2 and will now be discussed.

Figure 2:
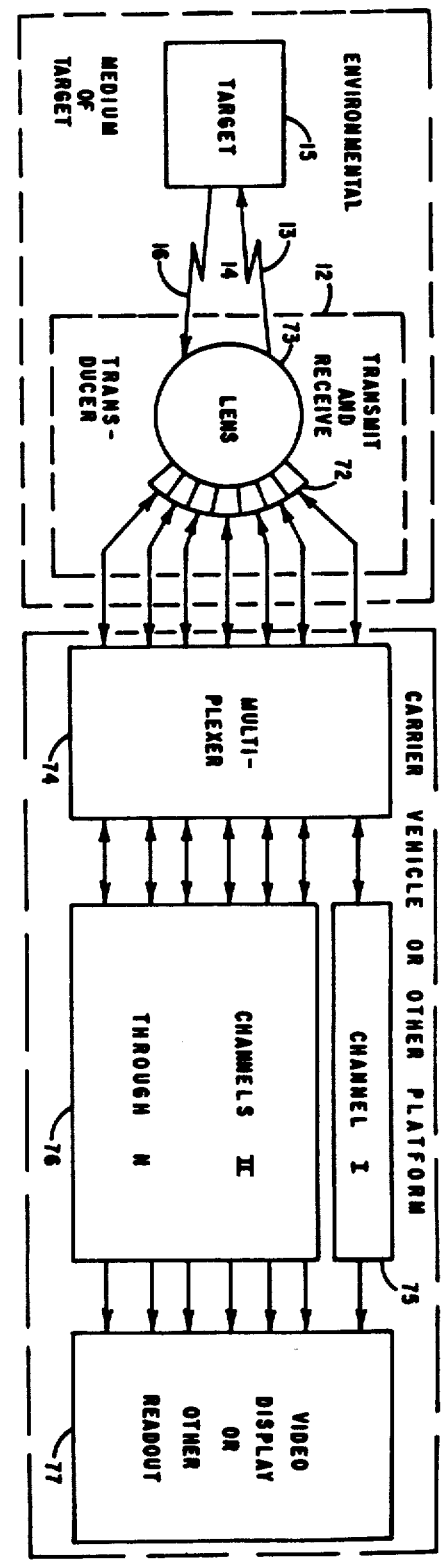
FIG. 2 depicts in block diagram form how the system of FIG. 1 may be combined within a total system constituting a plurality thereof.

To facilitate discussing FIG. 2 with respect to the elements and components depicted in FIG. 1, as appropriate, the reference numerals of both thereof will be identical for identical elements. Hence it may be seen that transmitting transducer 12, in this particular instance, incorporates a multiple of piezoelectric units which constitute reversible electroacoustical elements, the acoustical energy to and from which are properly and optimumly focused by lens 73 that it is compatible therewith. Hence, like before, the acoustic signal generated by transmit-receive transducer 12 is shown as signal 13 which travels through environmental medium 14, acquires target 15, and is reflected therefrom as return echo signal 16 thereto.

In this particular instance, also, the aforementioned plurality of piezoelectric elements 72 are each connected through a multiplexer 74 and then respectively connected to the inputs of channel I and channel II through N. Of course, the output from channels 1 through N are suitably connected to the input of a video display or other read-out that is compatible therewith and which is suitable to portray the particular information measured by the subject invention during any given operational circumstances.

From the foregoing, the artisan would be readily able to discern the versatility of the subject invention; therefore, it would be obvious that the applications therefor would be numerous, indeed.

Figure 3:
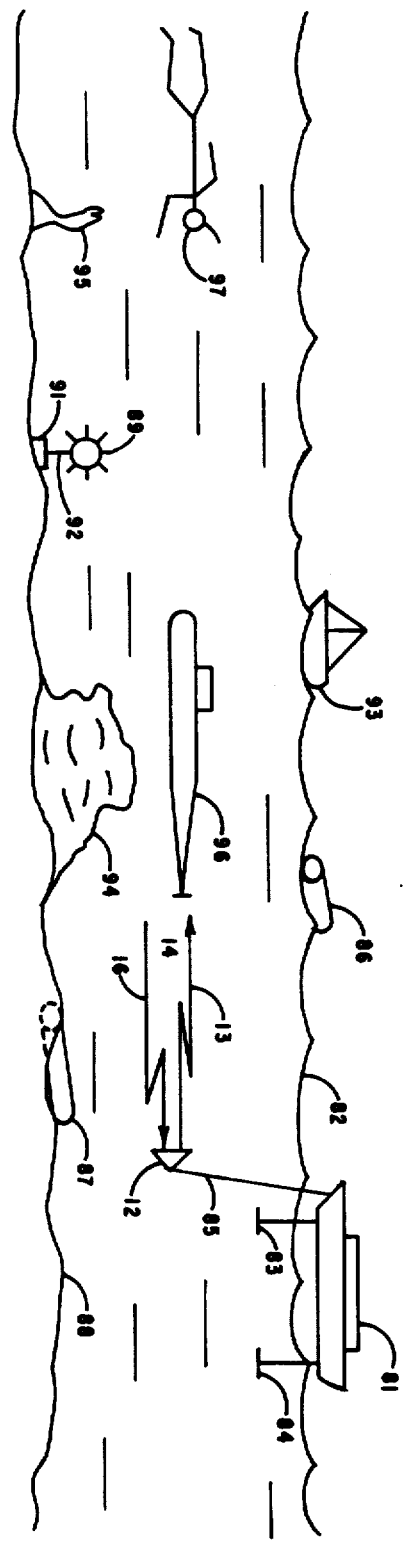
FIG. 3 is a quasi-pictorial illustration of an operational situation where the sonar systems of FIGS. 1 and 2 may be used to an advantage.

Some of the circumstances in which the subject invention may be used to an advantage are schematically illustrated in FIG. 3. Consequently, without any limitation intended, a hydrofoil boat 81 is shown as traveling fast enough from right to left through water 82 to be lifted up on its forward and rearward hydrofoil 83 and 84. Extending therefrom—by any appropriate support means 85—is the aforementioned transmit-receive transducer 12, which broadcasts and receives search acoustically target speed and reverberation signals herewith portrayed as search signal 13 and echo signal 16, respectively, with the latter being received from objects or targets that lie in the path of or substantially in the path of said hydrofoil boat 81. Of course, although not shown in FIG. 3, hydrofoil boat 81 likewise preferably carries the aforementioned transmitter and receivers making up the aforesaid channel I and any other additional channels II through N that may be employed in the subject sonar system. Of course, it would also preferably carry all of the apparatus associated therewith that is necessary or desirable for the operation thereof so that it will be effective as a doppler compensated sonar system in toto.

Again, without limitation intended, the following objects have been illustrated as being possible hazards or targets for hydrofoil boat 81 which may be acquired by the subject sonar, to thereby implement the safe running thereof along its navigated course or for any other suitable purpose: a log 86 floating on the surface of water 82; a marine mine 87 laying on, buried within, or partially buried within seafloor 88; another marine mine 89 that has been floated to some intermediate water depth position as a result of being anchored by an anchor 91 and a tether line 92; a boat 93, such as a sail boat or other slow moving boat, ship, or craft that might otherwise be invisible due to darkness, fog, or the like; a large rock 94 (or shallow place on which boat 81 could run aground); a submerged tree stump 95 that is not visible from the surface of the water or from boat 81; a submarine boat or other underwater vehicle; and a swimmer, human or otherwise.

Of course in addition to localizing and locating objects in the path of boat 81 that could be hazardous thereto, the subject sonar 11 may also be used to an advantage to locate other objects or targets (not shown), the presence of which is desired to be known for other reasons. One example of such situation would be the locating of people and things during search and rescue work; another example might be the locating of humans, animals, fish, or the like.

MODE OF OPERATION

The operation of the subject invention will now be discussed briefly with reference to some of the specifically disclosed values and parameters (but without limitation thereto), since it is believed that so doing will facilitate and expedite the understanding thereof in this particular instance.

As previously mentioned, carrier vehicle or hydrofoil vehicle 81 shown as running at relatively high speed along a predetermined course in water 14. Because of this speed, all hazardous objects and debris should be avoided if at all possible, in order to prevent collision therewith, which might cause damage to the hydrofoil or other parts of the boat. Therefore, to optimize the safety of operation thereof, the subject invention is incorporated therein and used during such high-speed conditions and perhaps other running conditions as well.

As hydrofoil boat 81 travels along its course, sonar 11—by means of signal generator 21, power amplifier 22, and transmit-receive switch 17, causes the aforementioned search signals 13 to be broadcast throughout water 14 in front thereof. Echo signal 16 of said search signals are then timely received from targets and objects in the path thereof, as is customary in the sonar art. Of course, as is also conventional in the sonar art, transmit-receive switch 17 allows signals to pass from power amplifier 22 of transmitter 18 to transducer 12 while blocking same said signals to preamplifier 23. And during the receive mode of operation, transmit-switch 17 allows the receive signals to pass from electroacoustical transducer 12 to said preamplifier 23 without interference with or from transmitter 18.

More specifically, in this particular case, as previously suggested, signal generator 21 of transmitter 18 generates a pulsed CW signal having a train of sign waves at a predetermined operating frequency of, say, 100 KHz and a train length of the order of 5 milliseconds. This pulsed CW signal is amplified to a more useful level by power amplifier 22. Transmit-receive switch 17 is switched to the transmit mode, allowing the amplified pulsed CW signal to excite transducer 12, the latter of which converts the electrical pulsed CW signal into acoustical signals proportional thereto and then radiates them as waves throughout the ambient water. Said radiated waves travel outwardly from transducer 12, and any discontinuities in the water made by such things as fish, logs, entrapped air, or the like, or any other discontinuities occurring at the water interfaces or boundaries—that is, surface or seafloor—caused a portion of said sound waves to be reflected back toward the point from which they were first radiated.

In this particular instance two specific discontinuities are considered to be of paramount importance. They are those particles dispersed in the water (entrapped air, suspended matter, etc.) which cause a volume reverberation echo or the water-air and water-bottom interfaces, which produce an echo, referred to as being surface and bottom reverberations respectively. Secondly, the instant invention compensates for those discontinuities occurring as a result of movement of the target acquired by the subject sonar with respect to its ambient environment, as well as with respect to hydrofoil boat 81. Of course, reverberation tracking filter 27 and target track filter 34 performs such functions, respectively.

In the event hydrofoil boat 81 happens to be stationary, the reflected CW energy signal will have the same frequency as that of the radiated search signal, and for all practical purposes the phase lock loop portion of target doppler track filter 33 will be inoperative in such case, although it will obviously pass the aforementioned reverberation tracking signal therethrough. However, if hydrofoil boat 81 is in motion, then a frequency shift will occur that is proportional to its speed, the velocity of acoustical energy propagation in the water, and frequency of the radiated sound. For instance, for a water medium, it can be shown that a frequency shift or doppler of 0.62 Hz per knot per KHz will occur; and, for example, for a boat speed of 65 knots in an operating frequency of 100 KHz, a doppler frequency shift 4,000 Hz will occur with respect to stationary target objects located in water 14.

As one of the other primary objectives of the subject sonar is to detect and avoid hazards located at or just below the water surface, and since the surface reverberation and such floating hazards have the same relative velocity with respect to boat 81, then if the frequency of said surface reverberation is tracked, the reflected acoustical echoes from such hazards will have the same frequency. Thus, by automatically centering the band of notch filter 29 around that frequency, the hazardous objects are more readily detected because some of the background noise is removed therefrom. As previously mentioned, such automatic tracking of the reverberation frequency spectrum is one of the keys to the unique operation of the invention.

Because the speed of boat 81 may change from zero to some maximum attainable speed, the frequency (or phase) of the doppler shifted reverberation continuously changes in like manner. Hence, it continually changes during the acceleration of the boat, and during the deceleration and can be used to automatically adjust the receiver portion of the invention, such that the return target echo signal will remain in the center of notch filter 29.

Then, still referring to FIG. 1, upon return of pulsed CW sound wave 16, it will be converted into an electrical signal proportional thereto by transducer 12. With transmit-receive switch 17 now in the receive mode, said received equivalent electrical signal is amplified to a more useful level by preamplifier 23, and further increased in magnitude by time-varied-gain amplifier 24 (in the conventional TVG manner) before being supplied through filter 25 to mixer 26. Of course, mixer 26 serves to mix the output signal from voltage controlled oscillator 43 with said return echo signal.

The beat or difference frequency from mixer 26 of said two signals is intended to remain constant at 31.2 KHz in this particular embodiment of the invention, and, thus, in effect, 31.2 KHz becomes the control point frequency. Of course, this beat frequency naturally occurs when boat 81 is not moving, since no doppler is present at that time. This may be calculated for mode-target motion by: (1) considering the return echo signal as having a 100 KHz frequency because the transmitted signal is equal to that generated by signal generator 21, which was previously defined as having been set at 100 KHz; (2) that voltage control oscillator 43 has been set to produce a 68.8 KHz signal at 0 voltage input thereto; and (3) that reference oscillator 39 generates a 31.2 KHz signal. Then, if the output of mixer 26 is 31.2 KHz, when effectively substracted from 31.2 KHz from reference oscillator 38 in phase detector 39 and low pass filter 41 combination, the difference therebetween (that is, the lower side band) is 0 voltage supplied to the input of VCO 43, thereby causing it to supply a 68.8 KHz signal to said mixer 26. Then, 100 KHz minus 68.8 KHz equals 31.2 KHz. In other words, since no phase difference exists in such case between the output signal from mixer 26 and reference oscillator 39, no error voltage exists, no voltage is supplied to VCO 43, and 68.8 KHz is mixed with 100 KHz to produce a difference signal of 31.2 KHz, the calibrated set point frequency. Consequently, phase lock loop 27 remains in a quiasant state for a no boat movement condition.

When boat 43 moves, and speed thereof increases, the frequency of the return reverberation signal also increases in proportion therewith. As the frequency increases, a 360 degree phase shift occurs for each hertz increase. It is this phase shift that is immediately sensed or detected (via hard limiter 42) by phase detector 40, whereby it produces a direct current voltage that is proportional thereto, herein defined as the DC error voltage. This DC error voltage is then passed through low pass filter 41 which blocks the 31.2 KHz fundamental frequency.

This DC error voltage is then applied to voltage control oscillator 43, which, in turn, increases its output signal frequency in proportion thereto and, at the same time, increases it to a value such that the difference between it and the return echo signal is kept constant at 31.2 KHz. Of course, this frequency adjusting continues as long as boat 81 is accelerating to its desired constant velocity. Consequently, the time constants of phase lock loop 27 should be so designed that a constant lock occurs for every value of acceleration, if optimum operation thereof is to be obtained, although it is recognized that some small amount of hunting may occur about the 31.2 KHz control point frequency.

The corrected signal having a frequency of 31.2 KHz, in this case, is supplied to intermediate frequency amplifier 28, where it is further refined and amplified to a more useful level before being supplied to the phase lock loop portion of target doppler track filter 33. Again, in this particular instance, notch filter 27 is preferably designed to have its center frequency of minimum response at the fixed frequency of 31.2 KHz and its overall bandwidth equal to 1 divided by PL, where PL is the length of the pulsed CW search signal. Thus, in this example, it would be the reciprocal of 5 milliseconds or 200 Hz.

The signals lying outside of the notch filter band of notch filter 29 are next passed into another phase lock loop herewith designated as the target doppler tracking filter 33. The operation of this filter is identical to that of the aforementioned phase lock loop filter 27, except that the time constants thereof are chosen to provide "lock-on" to a shorter duration signal corresponding to the target as opposed to the continuous reverberation signal.

The target signal is then fed through bandpass filter 34 into a standard envelope detector 35, the detected signal of which is then amplified and compared to a reference signal in thresholder 37, which passes only signals of a predetermined target size. If so desired, thresholder 37 may be of the type that is adjustable, so that only received target echo signals having an amplitude above a certain noise level will be displayed by video display 38, thereby eliminating many false targets that could otherwise cloud the target display picture.

As previously mentioned, the sweep of video display 38 is triggered by transmitter 18 so that the time and distance interval on the scope thereof between transmit and receive signals represents range to the acquired targets.

Because the frequency of the output signal from voltage control oscillator 43 is proportional to the speed of boat 81, this frequency can be processed to indicate such speed. Detector 45 performs this function. It comprises crystal controlled oscillator 46 that has been set to produce a 68.8 KHz, which is mixed with the frequency of the output signal from voltage controlled oscillator 43 to, in turn, produce a signal including the lower side band or beat frequency thereof. This beat frequency is separated out by low pass filter 47 and supplied to frequency counter 48. Of course, because said beat frequency is proportional to the speed of boat 81, frequency counter 48 is ordinarily calibrated in terms of velocity and, hence, will directly indicate the speed thereof in knots or some other parameter.

The speed of any particular acquired target is likewise proportional to the beat frequency signal which results from the mixing of the output signal from voltage control oscillator 55 of phase lock loop 33 and adjustable oscillator 58. The output of mixer 57 is thus supplied to low pass filter 59 which extracts the lower side band thereof, the frequency of which is proportional to the speed or velocity of any particular acquired target. This beat frequency signal is then supplied to target speed indicator 61 which, of course, also is a properly calibrated frequency counter.

The embodiment of FIG. 1, as previously suggested, constitutes only one channel of the invention; however, it should be obvious from FIG. 2 that any number of similar channels having the same or different design parameters may be included in the invention if so desired. Obviously, it would be well within the purview of one skilled in the art having the benefit of the teachings presented herewith to incorporate as many of said channels as would be needed to optimize the subject invention for any given operational circumstances. Moreover, inspection of the system of FIG. 2 by the artisan would readily cause him to discern that suitable multiplexers—such as that shown and identified at multiplexer 74—may be incorporated in the invention between the outputs of transmit and receive transducer 12 and channels I through N. Of course, the output of said channels and supplied to the respective inputs of any suitable video display or other readout 77, so that the information acquired by the subject invention will be readily available to the operator or operators of carrier vehicle 49 or any other platform, as the case may be.

Inspection of FIG. 3 obviously discloses a plurality of various and sundry objects which may be acquired by the subject invention. In as much as most of said objects constitute hazards which are to be avoided, incorporation of the subject invention in any marine or any other vehicle which desires avoid them will facilitate it so doing. Hence, as disclosed, the subject invention constitutes a worthwhile advancement in the doppler sonar art.

Obviously, other embodiments and modifications of the subject invention will readily come to mind of one skilled in the art having the benefit of the teachings presented in the foregoing description and the drawings. It is, therefor, to be understood that this invention is not to be limited thereto and that said modifications and embodiments are intended to be included within the scope of the appended claims.

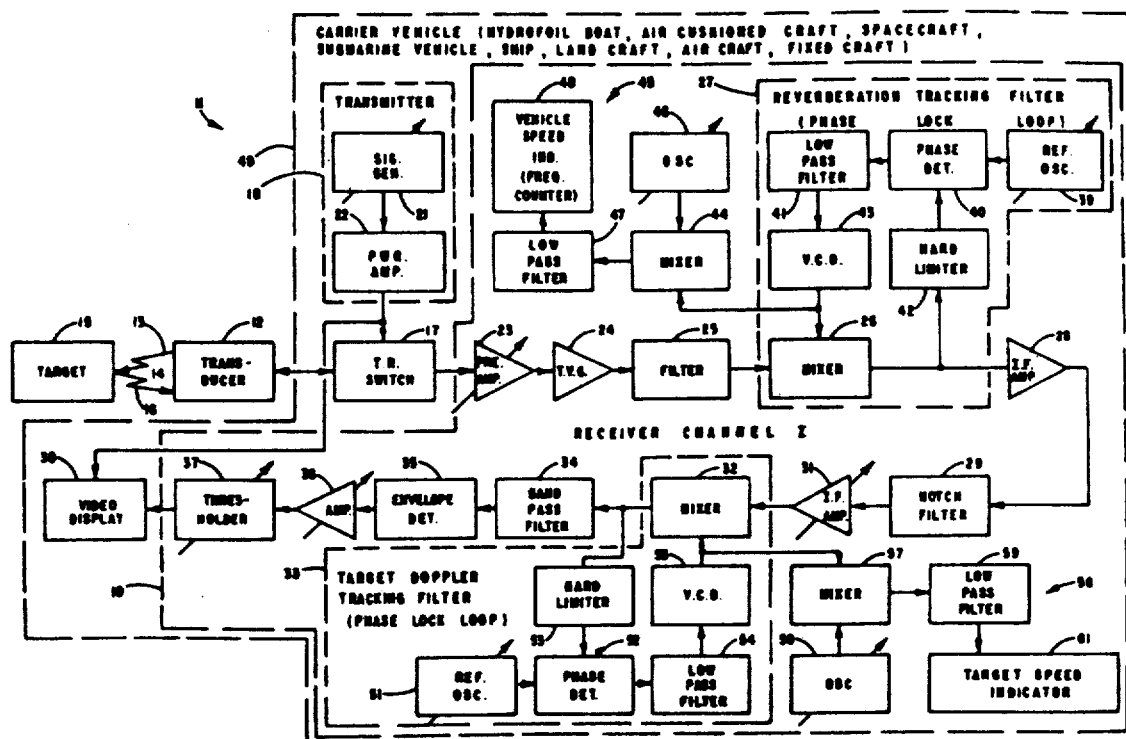

What is claimed is:

1. An echo-ranging-search system adapted for being mounted on a carrier vehicle that is capable of moving in a predetermined environmental medium, comprising in combination:

means for broadcasting a predetermined target search signal within the aforesaid predetermined environmental medium;

receiving and converting means effectively synchronized with said broadcasting means for receiving the aforesaid predetermined target search signal after it has been reflected as an echo signal from a target located within said predetermined environmental medium and for converting it into a first electrical signal that is proportional thereto;

first mixing means connected to the output of said receiving and converting means for mixing said first electrical signal with a second electrical signal supplied thereto, so as to produce a third electrical signal at the output thereof;

notch filter means effectively connected to the output of said first mixing means for filtering said third electrical signal in such manner as to pass a predetermined band of frequencies therethrough;

second mixing means having a pair of inputs and an output, with one of the inputs thereof effectively connected to the output of said notch filter means;

a narrow band pass filter means connected to the output of said second mixing means;

detector means connected to the output of said narrow bandpass filter means;

means effectively connected to the output of said detector means for reading out a predetermined level of the output signal therefrom in terms of the targets from which the aforesaid echo signal is reflected;

means connected to the output and the other input of said first mixing means for adjusting the frequency of said second electrical signal supplied to the other input thereof in such manner as to compensate for reverberations received from within the aforesaid environmental medium within said echo signals;

and means connected between the output and the other input of said second mixing means for adjusting the output signal therefrom in such manner as to compensate for any doppler effects that occur therein due to any relative movement between the aforesaid receiving and converting means and said target.

2. A sonar system, comprising in combination:

means for broadcasting an acoustical target search signal throughout a predetermined portion of an aqueous medium;

means effectively synchronized with said broadcasting means for receiving the aforesaid acoustical target search signal after it has been reflected as an echo signal from a target located within said aqueous medium and for converting said echo signal into a first electrical signal that is proportional thereto;

means effectively connected to the output of said reflected echo signal receiving and converting means for mixing the first electrical signal therefrom with a second electrical signal supplied thereto, so as to produce a third electrical signal at the output thereof;

means connected between the output and the second signal input of said first and second signal mixing means for adjusting the frequency of said third electrical signal in such manner as to compensate for the reverberation frequencies received from the aforesaid aqueous medium;

means effectively connected to the output of said first and second signal mixing means for passing a fourth signal constituting that portion of said third signal which contains a first predetermined band of frequencies minus a second predetermined band of frequencies which has been notched from the center thereof, thereby excluding those signals therefrom which represent the reverberation frequency band of the aforesaid aqueous medium;

means effectively connected to the output of said fourth signal passing means for the mixing of said fourth signal with a fifth signal to thereby produce a sixth signal as the output thereof;

means connected between the output and the fifth signal input of said fourth and fifth signal mixing means for adjusting the frequency of said sixth signal in such manner as to compensate for any relative movement between the aforesaid receiving and converting means and said target;

means connected to the output of said fourth and fifth signal mixing means for filtering and passing a predetermined narrow frequency band portion of said sixth signal;

means connected to the output of said filtering and passing means for detecting said filtered sixth signal; and means effectively connected to the output of said detecting means for reading out a predetermined level of the aforesaid filtered and detected sixth signal in terms of a predetermined parameter.

3. The sonar system of claim 2, wherein said means for broadcasting an acoustical target search signal throughout a predetermined portion of an aqueous medium comprises:

an adjustable frequency signal generator; and a reversible electroacoustical transducer effectively connected to the output of said adjustable frequency signal generator.

4. The sonar system of claim 2, wherein said means effectively synchronized with said broadcasting means for receiving the aforesaid acoustical target search signal after it has been reflected as an echo signal from a target located with said aqueous medium and for converting said echo signal into a first electrical signal that is proportional thereto comprises:

a reversible electroacoustical transducer;

a preamplifier effectively connected to the output of said reversible electroacoustical transducer;

a time-varied-gain amplifier connected to the output of said preamplifier; and a filter connected to the output of said time-varied-gain amplifier.

5. The sonar system of claim 2, wherein said means effectively connected to the output of said reflected echo signal receiving and converting means for mixing the first electrical signal therefrom with a second electrical signal supplied thereto so as to produce a third electrical signal at the output thereof comprises a mixer.

6. The sonar system of claim 2, wherein said means connected between the output and the second signal input of said first and second signal mixing means for adjusting the frequency of said third electrical signal in such manner as to compensate for the reverberation frequencies received from the aforesaid aqueous medium comprises:

a hard limiter connected to the output of said mixing means;

a phase detector having a pair of inputs and output, with one of the inputs thereof connected to the output of said hard limiter;

an adjustable reference oscillator, with the output thereof connected to the other input of said phase detector;

a low pass filter connected to the output of said phase detector; and a voltage controlled oscillator connected between the output of said low pass filter and the other input of the aforesaid mixing means.

7. The sonar system of claim 2, wherein said means effectively connected to the output of said first and second signal mixing means for passing a fourth signal constituting that portion of said third signal which contains a first predetermined band of frequencies minus a second predetermined band of frequencies which have been notched from the center thereof, thereby excluding those signals therefrom which represent the reverberation frequency band of the aforesaid aqueous medium comprises a notched comb filter.

8. The sonar system of claim 2, wherein said means connected to the output of said fourth signal passing means for the mixing of said fourth signal with a fifth signal, to thereby produce a sixth signal at the output thereof comprises a mixer.

9. The sonar system of claim 2, wherein said means connected between the output and the fifth signal input of said fourth and fifth signal mixing means for adjusting the frequency of said sixth signal in such manner as to compensate for any relative movement between the aforesaid receiving and converting means and said target comprises:
- a hard limiter connected to the output of said fourth and fifth signal mixing means;
- a phase detector having a pair of inputs and an output, with one of the inputs thereof connected to the output of said hard limiter;
- an adjustable reference oscillator, with the output thereof connected to the other input of said phase detector;
- a low pass filter connected to the output of said phase detector; and
- a voltage controlled oscillator connected between the output of said low pass filter and the other input of the aforesaid fourth and fifth signal mixing means.

10. The sonar system of claim 2, wherein said means connected to the output of said fourth and fifth signal mixing means for filtering and passing a predetermined narrow frequency band portion of said sixth signal comprises a narrow band pass filter, the frequency center of which is equal to the inverse of the length of the pulse of the aforesaid acoustical target search signal that was broadcast by said broadcasting means.

11. The sonar system of claim 2, wherein said means connected to the output of said filtering and passing means for detecting said filtered sixth signal comprises and envelope detector.

12. The sonar system of claim 2, wherein said means effectively connected to the output of said detecting means for reading out a predetermined level of the aforesaid filtered and detected sixth signal in terms of a predetermined parameter comprises:
- a thresholder; and
- a video display means connected to the output of said thresholder.

13. The sonar system of claim 2, further characterized by carrier vehicle means disposed in said aqueous medium for supporting said sonar system.

14. The sonar system of claim 13, wherein said carrier vehicle means comprises a hydrofoil boat.

15. The sonar system of claim 13, wherein said carrier vehicle means comprises a submarine boat.

16. The sonar system of claim 13, wherein said carrier vehicle means comprises an aircushioned craft.

17. A sonar system, mounted on a carrier vehicle that is disposed for movement in a body of water, for detecting and indicating objects located in said body of water in the path of said carrier vehicle as it moves therethrough, comprising in combination:
- a reversible electroacoustical transducer having an input-output;
- a transmit-receive switch, having an input-output, an input, and an output, with the input-output thereof connected to the input-output of said reversible electroacoustical transducer;
- a preamplifier connected to the output of said transmit-receive switch;
- a time-varied-gain amplifier connected to the output of said preamplifier;
- a filter connected to the output of said time-varied-gain amplifier;
- a first mixer having a pair of inputs and an output, with one of the inputs thereof connected to the output of said filter;
- a notched comb filter effectively connected to the output of said first mixer;
- a second mixer having a pair of inputs and an output, with one of the inputs thereof connected to the output of said notched comb filter;
- a narrow band filter connected to the output of said second mixer;
- an envelope detector connected to the output of said narrow band filter;
- an adjustable thresholder effectively connected to the output of said envelope detector;
- a readout connected to the output of said thresholder;
- a first adjustable frequence reference oscillator;
- a first phase detector having a pair of inputs and an output, with one of the inputs thereof connected to the output of said first adjustable frequency reference oscillator;
- a hard limiter connected between the output of the aforesaid first mixer and the input of said first phase detector;
- a first low pass filter connected to the output of said first phase detector;
- a first voltage controlled oscillator connected between the output of said first low pass filter and the other input of the aforesaid first mixer;
- a second adjustable frequency reference oscillator;
- a second phase detector having a pair of inputs and an output, with one of the inputs thereof connected to the output of said second adjustable frequence reference oscillator;
- a hard limiter connected between the output of the aforesaid second mixer and the input of said second phase detector;
- a second low pass filter connected to the output of said second phase detector; and
- a second voltage controlled oscillator connected between the output of said second low pass filter and the other input of the aforesaid second mixer.

18. The invention of claim 17, further characterized by:
- a third adjustable frequency oscillator;
- a third mixer having a pair of inputs and an output, with one of the inputs thereof connected to the output of said third adjustable frequency oscillator, and with the other input thereof connected to the output of the aforesaid first voltage controlled oscillator;
- a third low pass filter connected to the output of said third mixer;
- a first frequency counter that is calibrated in terms of a first predetermined parameter connected to the output of said low pass filter;
- a fourth adjustable frequency oscillator;
- a fourth mixer having a pair of inputs and an output, with one of the inputs thereof connected to the output of said fourth adjustable frequency oscillator, and with the other input thereof connected to the output of the aforesaid second voltage controlled oscillator;
- a fourth low pass filter connected to the output of said fourth mixer; and
- a second frequency counter that is calibrated in terms of a second predetermined parameter connected to the output of said fourth low pass filter.

* * * * *

UNITED STATES PATENT AND TRADEMARK OFFICE
CERTIFICATE OF CORRECTION

PATENT NO. : 4,954,999

DATED : September 4, 1990

INVENTOR(S) : Teel et al

It is certified that error appears in the above-identified patent and that said Letters Patent is hereby corrected as shown below:

The title page should be deleted to appear as per attached title page.

On the title page, "No Drawings" should read --2 Drawing Sheets--.

Insert Figures 1-3 as shown on the attached pages.

Signed and Sealed this

Third Day of November, 1992

Attest:

DOUGLAS B. COMER

*Attesting Officer*   Acting Commissioner of Patents and Trademarks

United States Patent [19]

Teel et al.

[11] Patent Number: 4,954,999
[45] Date of Patent: Sep. 4, 1990

[54] DOUBLE PHASE-LOCK-LOOP SONAR

[75] Inventors: Willis A. Teel; James T. Christoff, both of Panama City, Fla.

[73] Assignee: The United States of America as represented by the Secretary of the Navy, Washington, D.C.

[21] Appl. No.: 609,453

[22] Filed: Aug. 28, 1975

[51] Int. Cl.$^5$ .............................................. G01S 15/00
[52] U.S. Cl. ...................................................... 367/97
[58] Field of Search ........................... 340/3 D; 367/97

[56] References Cited

U.S. PATENT DOCUMENTS

| | | | |
|---|---|---|---|
| 2,961,190 | 11/1960 | Miller et al. | 367/97 |
| 3,024,755 | 3/1962 | Brooks | 367/96 |
| 3,617,995 | 11/1971 | Goulet | 367/97 |

Primary Examiner—Thomas H. Tarcza
Assistant Examiner—Daniel T. Pihulic
Attorney, Agent, or Firm—Harvey David; John Becker; Sol Sheinbein

[57] ABSTRACT

A doppler compensated sonar systems is disclosed as containing one or more data processing channels connected through a multiplexer to a like plurality of piezoelectric elements in a reversible electro-acoustical transducer. Each channel thereof includes a transmitter and a receiver, the latter of which includes signal perfecting circuitry and a pair of effectively series connected phase lock loops constituting reverberation and target doppler tracking filters, respectively. Hence, each of said channels effectively process received target signals without any adverse doppler effects being present therein which are then, in turn, read out by any suitable video display. When mounted on a fast moving vehicle, the subject doppler compensated sonar system optimizes the avoidance of hazardous or other objects that may occur in the path thereof.

18 Claims, No Drawings